1,849,165

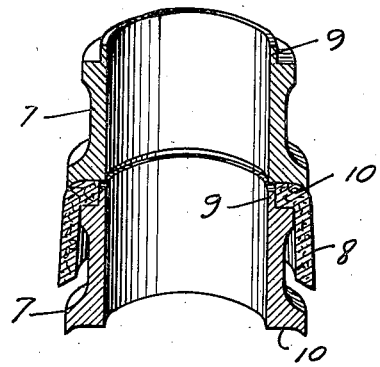
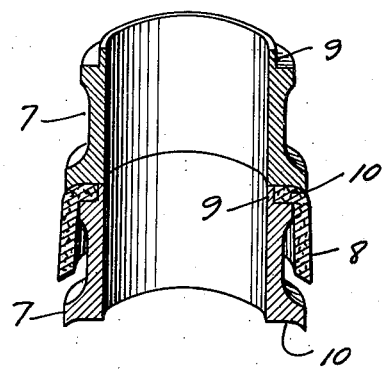
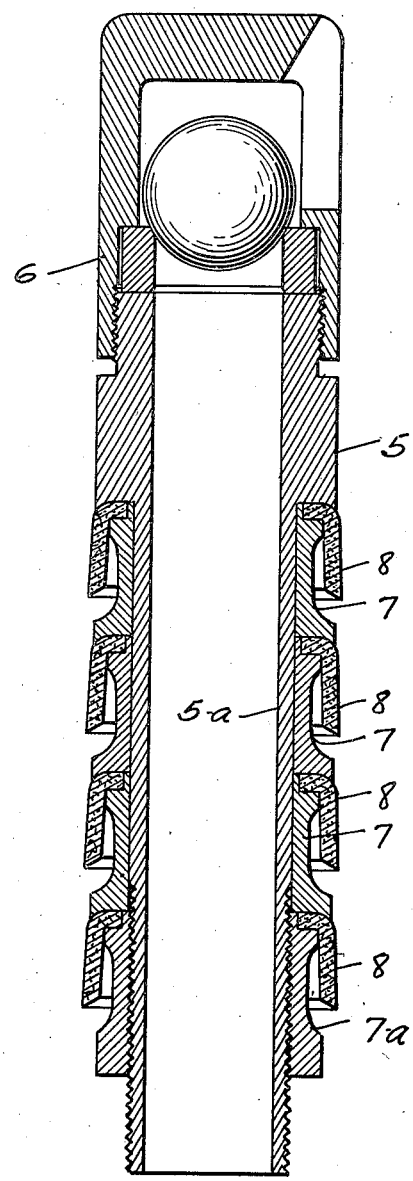
INVENTORS
John A. Yerkes
Rees H. Lemmon
BY
Westall and Wallace
ATTORNEYS Patented Mar. 15, 1932

UNITED STATES PATENT OFFICE

JOHN A. YERKES AND REES H. LEMMON, OF LONG BEACH, CALIFORNIA

PISTON CUP FOLLOWER RING

Application filed March 30, 1931. Serial No. 526,446.

This invention relates to a plunger assembly having packing cups held in place on a plunger body by cup follower rings. The features of the present invention reside in the follower rings.

The conventional types of such plunger assemblies have follower rings slidably mounted in seriatim on a body. In an inverted plunger the top ring of the series abuts a shoulder fixed on the plunger body and the bottom ring is threaded on the body. The flange heels of the cups are interposed between the adjacent follower rings so that the latter are spaced from one another. The cups and rings are then clamped in position by tightening up on the bottom ring. The follower rings are thus held apart by the bases or heel flanges of the cups and, as the latter are compressible, the grip on the cups is determined by the amount that the bottom follower is taken up. In such assembles the following disadvantages are present: Skill and experience on the part of the operator is required in clamping the cups on the body. Obviously, sufficient grip must be obtained on the heels of the cups to prevent their displacement. If the bottom follower is screwed up too tight, distortion and damage of the cups may occur. Furthermore, there is a tendency for the bottom cup to be compressed more than the others and damage may intially occur to this cup. If any of the cups become loose, (as is often the case) the remainder of the assembled cups and followers become loose and useless. When the fluid load is applied to the plunger and, if this load is great enough, the entire cup assembly tends to slide away from the bottom follower, relieving the load thereon and leaving it free to turn and loosen with resultant damage. Deep well pumps are subject to such loosening of the cup assembly. Obviously, the regular type of plunger as compared with the inverted type has the same disadvantages.

The present invention has for its objects the provision of follower rings so constructed that the maximum amount of clamping of the cups is determined by the structure; each cup is clamped independent of the compression in the heel flanges of the remaining cups; a positive limit to the tightening of the assembly is provided; one cup may become loose without affecting the remaining cups.

The present invention has another more specific object in the provision of a follower ring having a cup seating face at one end and an externally reduced portion at the other end to provide a step, so that an assembly of rings forms annular grooves at ring junctures, the opposing walls of the grooves being formed by seating faces and steps.

These objects are accomplished by means of the embodiment of our invention illustrated in the accompanying drawings, in which:

Fig. 1 is a perspective view in section showing the relation of adjacent follower rings and a cup before clamping; Fig. 2 shows the same rings and cup in clamped position; Fig. 3 is a longitudinal section through a plunger body with follower rings and cups assembled in clamped position therein.

Referring more particularly to the drawings, 5 indicates a plunger body having a reduced portion 5a for receiving the nest of cups and followers. A plunger valve 6 is shown at the top of the plunger. A slightly convex cup seat is formed by a cup abutting face located between the enlarged and reduced portions of the body. The lower end of the body 5 is threaded to adjustably receive a clamping follower ring. The body as described is of the conventional type.

Slidably mounted on the body are follower rings 7 with a bottom follower ring 7a having its bore threaded to engage with the threads on the plunger body. These followers are preferably formed of steel. Interposed between the body and top follower ring and between adjacent follower rings are conventional cups 8. It will be noted that the follower rings are externally reduced at one end as indicated by 9 to provide an outstanding annular ledge. The other end of each follower ring has a convex seating face 10. The rings and cups are assembled with the reduced portion of each ring facing a cup seating face. The heel flanges of the cups are disposed within the grooves formed at the junctures of adjacent rings. In Figs. 1, the assembly is shown before clamping and compression of the cups. The bottom ring 7a is screwed up to cause the rings to positively abut. The compression of the cups is determined and limited by the dimensions of the grooves. The cups cannot be "made-up" too loosely, if simple directions are followed. Similarly, it is impossible to "make-up" the cups too tightly. If, for any reason, any single cup should tear loose during the pumping operation, all of the other cups will still be in position to continue to operate efficiently. Regardless of the fluid load against the cups, there can be no tendency for the cups and followers to slide away from the bottom cup follower 7a. Thus, the assembly is always rigidly locked.

Fig. 1 shows that the interiorly extending heel or base of a cup is substantially greater in height than the reduced portion 9 of a cup. Obviously, the height of the cup base and also the height of the grooved portion of the follower must be carefully predetermined in the manufacture so that when the cup followers are clamped together, as in Fig. 2, the resilient bases of the cups will be tightly clamped but will still permit the abutting steel faces of the cup follower to meet. The resiliency and compressibility of the cup material is, of course, an important factor. The spacing must be such that the cup base will not be injured when the bottom cup follower 7a is advanced until the abutting steel surfaces of the followers meet.

What we claim is:—

1. A plunger assembly comprising a body having a cup nest abutment at one end, follower rings slidably mounted on said body, a clamping follower ring at the end opposite to said abutment, cups on said body having heel flanges interposed between said rings; said rings abutting one another and having at abutting junctures annular grooves in which the heels of said cups are disposed, the opposing walls of said grooves being formed on adjacent follower rings.

2. A plunger assembly comprising a body having a cup nest abutment at one end, follower rings slidably mounted on said body, a clamping follower ring at the end opposite to said abutment, cups on said body having heel flanges interposed between said rings; said rings abutting one another, the end of each ring abutting its adjacent ring having an externally reduced portion to provide annular grooves in which the heels of said cups are disposed, the opposing walls of said grooves being formed on adjacent follower rings.

3. A plunger assembly comprising a body having a cup nest abutment at one end, follower rings slidably mounted on said body, a clamping follower ring at the end opposite to said abutment, cups on said body having heel flanges interposed between said rings; said rings abutting one another, each ring having at one end an externally reduced portion and at the other end a cup seating face, the externally reduced portion of each ring abutting the seating face of the adjacent ring to provide annular grooves in which the heels of said cups are disposed, the opposing walls of said grooves being formed on adjacent follower rings.

4. A plunger follower ring nest, comprising follower rings adapted to have the heel flanges of cups interposed between adjacent rings; said rings positively abutting one another and having at their abutting junctures annular grooves in which the heels of said cups may be disposed, the opposing walls of said grooves being formed on adjacent follower rings.

In witness that we claim the foregoing we have hereunto subscribed our names this 26th day of March, 1931.

JOHN A. YERKES.
REES H. LEMMON.